US012267349B1

(12) United States Patent
Black et al.

(10) Patent No.: US 12,267,349 B1
(45) Date of Patent: Apr. 1, 2025

(54) MULTI-DIMENSIONAL ANOMALY SOURCE DETECTION

(71) Applicant: THE HUNTINGTON NATIONAL BANK, Columbus, OH (US)

(72) Inventors: Jason Black, Columbus, OH (US); Bradley Glenn, Columbus, OH (US); Cameron Conte, Columbus, OH (US)

(73) Assignee: THE HUNTINGTON NATIONAL BANK, Columbus, OH (US)

( * ) Notice: Subject to any disclaimer, the term of this patent is extended or adjusted under 35 U.S.C. 154(b) by 0 days.

(21) Appl. No.: 18/763,469

(22) Filed: Jul. 3, 2024

(51) Int. Cl.
*H04L 9/40* (2022.01)
(52) U.S. Cl.
CPC ................ *H04L 63/1425* (2013.01)
(58) Field of Classification Search
CPC .... H04L 43/12; H04L 67/535; H04L 63/1425
See application file for complete search history.

(56) References Cited

U.S. PATENT DOCUMENTS

| 11,294,756 | B1* | 4/2022 | Sadrieh | G06N 3/047 |
|---|---|---|---|---|
| 2018/0082208 | A1* | 3/2018 | Cormier | G06N 5/048 |
| 2022/0092612 | A1* | 3/2022 | Bharath | G06Q 30/0201 |
| 2022/0237620 | A1* | 7/2022 | Saarenvirta | G06Q 20/4016 |
| 2023/0033647 | A1* | 2/2023 | Lemberg | G06F 11/3452 |
| 2023/0067842 | A1* | 3/2023 | Yin | H04L 43/04 |
| 2023/0245234 | A1* | 8/2023 | Sumant | G06Q 30/0202 |
| | | | | 705/36 R |
| 2024/0095579 | A1* | 3/2024 | Paulraj | G06F 21/6245 |
| 2024/0223434 | A1* | 7/2024 | Cheng | H04L 41/16 |
| 2024/0356944 | A1* | 10/2024 | Mahajan | H04L 63/1425 |

OTHER PUBLICATIONS

Ang et al., "EADS: An Early Anomaly Detection System for Sensor-Based Multivariate Time Series," 2024 IEEE 40th International Conference on Data Engineering (ICDE) Year: 2024 | Conference Paper | Publisher: IEEE.*
Sun et al., "Unraveling the 'Anomaly' in Time Series Anomaly Detection: A Self-supervised Tri-domain Solution," 2024 IEEE 40th International Conference on Data Engineering (ICDE) Year: 2024 | Conference Paper | Publisher: IEEE.*

* cited by examiner

*Primary Examiner* — Roderick Tolentino
(74) *Attorney, Agent, or Firm* — Kilpatrick Townsend & Stockton LLP

(57) ABSTRACT

Techniques are described herein for validating the occurrence of an anomaly and/or identifying a source and/or impact of an anomaly initially detected in time series data. A plurality of time series data instances individually corresponding to a respective entity of a plurality of entities may be obtained. An anomalous value may be detected in a first time series data instance of the plurality of time series data instances, the first time series data instance being associated with an entity. One or more correlated entity peers for the entity may be identified based at least in part on a predefined hierarchy and/or segmentation scheme. The occurrence of the anomaly and/or the source and/or impact of the anomaly may be determined based on comparing the anomaly to time series data of the time series data of the correlated entity peers.

20 Claims, 8 Drawing Sheets

○ Common value for City
● Common value for ATM type
✕ Common value for Drive Through
✓ Common value for Indoor Lobby

Entity 402
ID: 1234
City: Seattle
State: Washington
Country: USA
ATM Type: ACME123
Drive-Through: Yes
Indoor Lobby: Yes
Number of employees: 52
Manager: Jane Doe
...

● ✓ Entity 404
ID: 5789
City: Portland
State: Oregaon
County: Multnomah
ATM Type: ACME123
Drive-Through: No
Indoor Lobby: Yes
Number of employees: 15
Manager: Marcy Doe
...

✓ Entity 406
ID: 6606
City: Renton
State: Washington
Country: King
ATM Type: ACME57
Drive-Through: No
Indoor Lobby: Yes
Number of employees: 22
Manager: Erika Doe
...

✕ ✓ Entity 408
ID: 6653
City: Bend
State: Oregaon
County: Deschutes
ATM Type: ACME789
Drive-Through: Yes
Indoor Lobby: Yes
Number of employees: 87
Manager: Bob Vance
...

Entity 410
ID: 1278
City: San Fransisco
State: California
County: San Fransisco
ATM Type: ACME66
Drive-Through: No
Indoor Lobby: No
Number of employees: 0
Manager: Nancy Drew
...

✕ Entity 412
ID: 1122
City: Boston
State: Massachusetts
County: Suffolk
ATM Type: ACME72
Drive-Through: Yes
Indoor Lobby: No
Number of employees: 8
Manager: John Doe
...

○ ● ✕ ✓ Entity 414
ID: 4657
City: Seattle
State: Washington
County: King
ATM Type: ACME123
Drive-Through: Yes
Indoor Lobby: Yes
Number of employees: 25
Manager: Barry White
...

○ ✕ ✓ Entity 416
ID: 8888
City: Seattle
State: Washington
County: King
ATM Type: ACME44
Drive-Through: Yes
Indoor Lobby: Yes
Number of employees: 50
Manager: Edward Doe
...

○ ✓ Entity 418
ID: 0317
City: Seattle
State: Washington
County: King
ATM Type: ACME99
Drive-Through: No
Indoor Lobby: Yes
Number of employees: 33
Manager: Bertrand Doe
...

MULTI-DIMENSIONAL ANOMALY SOURCE DETECTION

BACKGROUND

Anomaly detection techniques generally involve identifying points of data which fall outside of a normal trend for a specific data set. The points of data may be of particular interest since the points of data may represent inconsistencies with normal operations in industries where identifying inconsistencies is important to ensure proper operations and/or identify faults that need corrective actions. Modern data sets include increasingly large and complex amounts of data such that traditional approaches to accurately identify and detect anomalies in a way that is meaningful is increasingly challenging and time consuming.

BRIEF SUMMARY OF THE INVENTION

Techniques are provided for multi-dimensional anomaly source detection. Various embodiments are described herein, including methods, systems, non-transitory computer-readable storage media storing programs, code, or instructions executable by one or more processors, and the like.

One embodiment is directed to a computer-implemented method for obtaining a plurality of time series data instances individually corresponding to a respective entity of a plurality of entities and detecting an anomalous value in a first time series data instance of the plurality of time series data instances such that the first time series data instance may be associated with an entity of the plurality of entities. Additionally, the method may identify a correlated entity peer from the plurality of entities such that the correlated entity peer may be identified based at least in part on executing a correlation analysis algorithm on the first time series data instance corresponding to the entity and a second time series data instance corresponding to a second entity of the plurality of entities. The method may further determine whether the anomalous value detected in the first time series data instance that may correspond to the entity may indicate that an anomaly has occurred based at least in part on determining whether the anomalous value detected within the first time series data instance associated with the entity conforms to a value of the second time series data instance corresponding to the correlated entity peer.

In some embodiments, the method comprises performing one or more operations in response to determining that the anomalous value indicates that the anomaly has occurred such that the one or more operations may include transmitting a notification, transmitting an electronic message, or presenting data indicating the anomaly has occurred.

In some embodiments, the method includes wherein the anomaly is associated with a different attribute than an attribute associated with the anomalous value.

In some embodiments, the method comprises determining a source of the anomaly indicated by the anomalous value in the first time series data instance.

In some embodiments, the method comprises obtaining a predefined hierarchy and identifying a level of the predefined hierarchy with which the entity is associated. In some embodiments, the method comprises: identifying a next-highest level of the predefined hierarchy higher than the level with which the entity is associated such that the correlated entity peer is identified from one or more entities associated with the next-highest level of the predefined hierarchy.

In some embodiments, the method comprises identifying the correlated entity peer by obtaining a first attribute value associated with the entity such that the correlated entity peer is identified based at least in part on being associated with a second attribute value that matches the first attribute value.

In some embodiments, an anomaly detection system comprises one or more processors and one or more memories storing computer-executable instructions that, when executed by the one or more processors, causes the one or more processors to obtain a plurality of time series data instances individually corresponding to a respective entity of a plurality of entities. In some embodiments, the operations may further detect an anomalous value in a first time series data instance of the plurality of time series data instances such that the first time series data instance may be associated with an entity of the plurality of entities. In some embodiments, the operations may further comprise identifying a correlated entity peer from the plurality of entities such that the correlated entity peer may be identified based at least in part on executing a correlation analysis algorithm on the first time series data instance corresponding to the entity and a second time series data instance corresponding to a second entity of the plurality of entities. In some embodiments, the operations may further comprise determining whether the anomalous value detected in the first time series data instance corresponding to the entity indicates that an anomaly has occurred based at least in part on determining whether the anomalous value detected within the first time series data instance associated with the entity conforms to a value of the second time series data instance corresponding to the correlated entity peer.

In some embodiments, executing the computer-executable instructions further causes the one or more processors to perform one or more operations in response to determining that the anomalous value indicates that the anomaly has occurred such that the one or more operations comprising transmitting a notification, transmitting an electronic message, or presenting data indicating the anomaly has occurred.

In some embodiments, the anomaly may be associated with a different attribute than an attribute associated with the anomalous value.

In some embodiments, executing the computer-executable instructions further causes the one or more processors to determine a source of the anomaly indicated by the anomalous value in the first time series data instance.

In some embodiments, executing the computer-executable instructions further causes the one or more processors to identify the correlated entity peer further causes the one or more processors to obtain a predefined hierarchy and identify a level of the predefined hierarchy with which the entity is associated. In some embodiments, executing the computer-executable instructions further causes the one or more processors to identify the correlated entity peer further causes the one or more processors to identify a next-highest level of the predefined hierarchy higher than the level with which the entity is associated such that the correlated entity peer may be identified from one or more entities associated with the next-highest level of the predefined hierarchy.

In some embodiments, executing the computer-executable instructions further causes the one or more processors to identify the correlated entity peer further causes the one or more processors to obtain a first attribute value associated with the entity such that the correlated entity peer is identified based at least in part on being associated with a second attribute value that matches the first attribute value.

In some embodiments, the anomaly is identified as relating to the entity and its correlated entity peer.

In some embodiments, a non-transitory computer-readable storage medium storing computer-executable instructions that, when executed with one or more processors of a computing device, causes the computing device to obtain a plurality of time series data instances individually corresponding to a respective entity of a plurality of entities and detect an anomalous value in a first time series data instance of the plurality of time series data instances such that the first time series data instance may be associated with an entity of the plurality of entities. In some embodiments, executing the computer-executable instructions further causes the computing device to perform one or more operations comprises identifying a correlated entity peer from the plurality of entities such that the correlated entity peer may be identified based at least in part on executing a correlation analysis algorithm on the first time series data instance corresponding to the entity and a second time series data instance corresponding to a second entity of the plurality of entities. In some embodiments, executing the computer-executable instructions further causes the computing device to perform one or more operations may include determining whether the anomalous value detected in the first time series data instance corresponding to the entity indicates that an anomaly has occurred based at least in part on determining whether the anomalous value detected within the first time series data instance associated with the entity conforms to a value of the second time series data instance corresponding to the correlated entity peer such that the anomaly is identified as relating to the entity and its correlated entity peer.

In some embodiments, executing the computer-executable instructions further causes the computing device to perform one or more operations in response to determining that the anomalous value indicates that the anomaly has occurred such that the one or more operations comprising transmitting a notification, transmitting an electronic message, or presenting data indicating the anomaly has occurred.

In some embodiments, the anomaly is associated with a different attribute than an attribute associated with the anomalous value.

In some embodiments, executing the computer-executable instructions further causes the one or more processors to determine a source of the anomaly indicated by the anomalous value in the first time series data instance.

In some embodiments, executing the computer-executable instructions further causes the one or more processors to identify the correlated entity peer further causes the one or more processors to obtain a predefined hierarchy and identify a level of the predefined hierarchy with which the entity is associated. In some embodiments, executing the computer-executable instructions further causes the one or more processors to identify a next-highest level of the predefined hierarchy higher than the level with which the entity is associated, wherein the correlated entity peer is identified from one or more entities associated with the next-highest level of the predefined hierarchy.

In some embodiments, executing the computer-executable instructions further causes the computing device to identify the correlated entity peer further causes the one or more processors to obtain a first attribute value associated with the entity, wherein the correlated entity peer is identified based at least in part on being associated with a second attribute value that matches the first attribute value.

BRIEF DESCRIPTION OF THE DRAWINGS

Various embodiments in accordance with the present disclosure will be described with reference to the drawings, in which:

FIG. 4 is an example block diagram illustrating one or more entities and one or more associated peers, in accordance with at least one embodiment;

DETAILED DESCRIPTION

Figure 1:
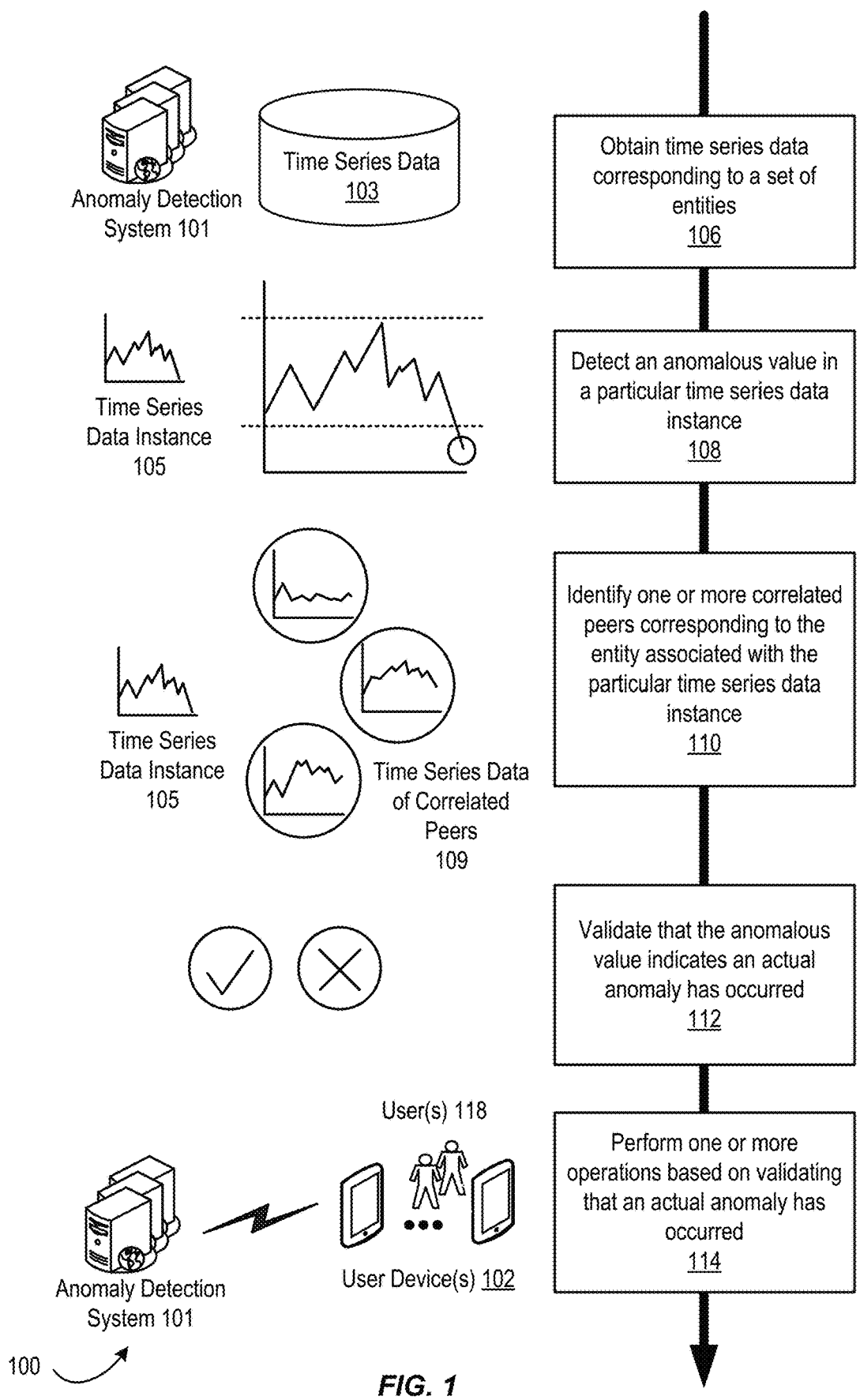
FIG. 1 is an example flow for validating, using time series data of entities that are associated with one another in at least one dimension, that an anomaly has occurred, in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques are provided for multi-dimensional anomaly source detection. More particularly, techniques are described for peer hierarchy anomaly source detection and/or segmentation anomaly source detection. In some embodiments, remedial actions may be implemented based on detection of the anomaly source. Various embodiments are described herein, including methods, systems, non-transitory computer-readable storage media storing programs, code, or instructions executable by one or more processors, and the like.

Some or all of the process (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

In various data analysis methodologies, anomaly detection may be used in a number of industries such as medical, banking, chemical engineering, mechanical engineering, fraud detection, or similar fields to determine if a dataset contains an anomaly (e.g., an outlier, data that does not align with what may typically be considered to be normal behavior for the data set). Anomalous behavior may be detected in data corresponding to a first entity. Often, and perhaps erroneously, conventional techniques may the source of the anomaly as the entity corresponding to the data with which the anomaly was detected. Conventionally, the impact of the anomaly may be considered to be only the entity corresponding to the data with which the anomaly was detected. However, it may be the case that the source/impact of the abnormality spans more than the single entity that is associated with the data with which the abnormality was detected. Determining a source and/or impact for the anomaly is difficult when the data set has a high number of dimensions (e.g., different types of entities, each having a variety of attributes that may be the same or different from one another).

The disclosed techniques disclosed herein provide improvements to anomaly detection by performing a multi-dimensional dataset analysis using correlated entity peers through hierarchical and/or segmentation anomaly detection techniques. The disclosed methods may include obtaining at least one time series (e.g., a dataset that includes transactions for the previous month) from a specific entity (e.g., a banking branch referred to as the "first entity"). The first entity may be one of a number of entities providing time series data instances, and not all entities must be similar. For example, the time series data instances may include datasets from disparate entities (e.g., banking branches, ATMs, loan providers, etc.).

When anomalous behavior is detected within the first entity's time series data instance, the source or impact of the anomaly may be ascertained using a hierarchical and/or a segmentation anomaly detection technique. The hierarchical anomaly detection technique may include comparing the time series data instance in which the anomalous behavior was detected to the time series data corresponding to correlated peers at different levels of a predefined hierarchy (e.g., other banking branches across a city, other banking branches in the same county, etc.). Entities that typically have similarly behaving time series data may be referred to as "correlated peers." Correlated peers may be identified at runtime, or as part of preprocessing, based at least in part on using any suitable correlation technique (e.g., correlation matrices and the like) to identify time series data instances that exhibit similar behavior (e.g., times series data instances that include values that typically fluctuate in a similar manner). Through these comparisons at different levels of the hierarchy, a source and/or impact of a particular anomaly may be determined. In some embodiments, the occurrence of the anomaly may be validated through similar comparisons (e.g., to verify that the anomalous behavior is evidence in the time series data of correlated peers).

A segmentation anomaly detection technique may be similarly employed to validate that an anomaly has occurred and/or if the anomaly affects a greater number of entities that just the one associated with the time series data in which the anomaly was initially detected. Entities may be associated with any suitable number of attributes. The segmentation anomaly detection technique may function in a similar manner as the hierarchical technique discussed above to identify correlated peers that share an attribute. In this case, the shared attribute may be one that is not related to a hierarchy. By comparing time series data behavior to various correlated peers associated with one or more shared attributes, the source/impact of the anomalous behavior may be attributed to entities that share the attribute instead of attributing the anomaly only to the entity that corresponds to the data in which the initial anomalous behavior was detected.

Utilizing these techniques, arbitrarily large datasets with ambiguously defined boundaries may be analyzed to determine anomalous behavior across entities. Using the disclosed correlated entity peer analysis techniques based on a hierarchy and/or a segmentation, a previously complex multi-dimensional task is reduced to fewer dimensions and complexity while enabling the identification of the source and/or impact of the anomaly/anomalous behavior. The disclosed techniques provide an efficient method for anomaly detection by processing only data that is relevant to the specific entity rather than arbitrarily searching time series data of every entity in the data set. The hierarchical and segmentation anomaly detection techniques may be used in any suitable order, any suitable number of times in order to 1) confirm that an anomaly detected in one entity's time series data is, in fact, anomalous and 2) to identify a particular hierarchical level and/or attribute with which the anomaly appears to relate.

In some embodiments, any suitable number of remedial actions may be employed by one or more systems to notify, mitigate, forecast, and/or limit potential negative effects caused by the anomalous source. In some embodiments, these remedial actions may be triggered by the techniques discussed herein automatically or by user defined presets.

Moving on to FIG. 1 which illustrates an example flow 100 for validating, using time series data of entities that are associated with one another in at least one dimension, that an anomaly has occurred, in accordance with at least one embodiment. The operations discussed in connection with FIG. 1 may be performed with an Anomaly Detection System 101 (hereinafter "ADS 101"). In some embodiments, ADS 101 may be implemented by one or more computer(s), as a service, within an application, or the like. The operations discussed in connection with FIG. 1 may be performed in any suitable order. More or fewer operations than those depicted in FIG. 1 may be employed without diverting from this disclosure.

The flow 100 may begin at block 106, where data relating to time series data 103 (data points captured over a time interval, such as a few hours) is obtained. The time series data 103 may correspond to a set of entities (e.g., various bank branches). The time series data 103 may be obtained by monitoring (by way of a network connection such as the Internet) a data stream (e.g., receipts, transactions, or similar) or the time series data 103 may be obtained by retrieving historical records (e.g., transactions from the previous day), or any suitable combination thereof. The time series data 103 may include data across time periods that have predefined limits. For example, time series data 103 may include data recorded over a few seconds to a few years. Time series data 103 may include time series data from any suitable number of entities. In some embodiments, the set of entities may include common attributes with differing attribute values. For example, if the set of entities includes ATMs a common attribute may be an ATM model, where the corresponding value indicates the model number of that particular ATM.

In some embodiments, the time series data 103 may include subsets of time series (e.g., time series retrieved from different entities to be correlated at a later step). By way of example, a first subset of the time series data 103 could include data corresponding to transactions processed at a specific banking branch. A second subset time series may include a number of loans denied during the last year at a specific banking branch. The first subset time series and the second subset time series may be included in the time series data 103. It is contemplated that any suitable number of subset time series may be included in the time series data 103 according to any suitable number of entities and/or attributes.

The flow 100 may continue at block 108, where the operations may detect an anomalous value in time series data instance 105. By way of example, transactions performed at a bank branch in Wichita, Kansas may be monitored by ADS 101, potentially, during a specific day of the week (e.g., Fridays). Based on analyzing time series data instance 105, a confidence interval (e.g., a range) may be determined that indicates a threshold confidence value (e.g., 95%) that the number of transactions on any given Friday will be with the confidence interval (e.g., between 300 and 350 transactions corresponding to a lower and upper bounds of a confidence interval). However, the time series data instance 105 associated with a particular Friday may indicate that there was only 100 transactions. The ADS 101 may detect this value as being outside the threshold confidence interval and may flag this increase as a potential anomaly. As another example, ADS 101 may use one or more unsupervised data processing technique(s) such as identifying drifts (e.g., unidirectional temporal changes in data), event changes (e.g., systematic or instantaneous changes from typical behavior), and/or outlier deviations (e.g., patterns that appear outside typical behaviors) to detect an anomalous value in the time series data instance 105.

Any suitable techniques such as outlier deviation algorithms, mathematical means, standard deviations, medians, and quantiles may be used to detect anomalous behavior in time series data. For example, if the median of transactions is 300 per day, then a value of 100 transactions would be flagged by ADS 101 as an outlier on a normal standard deviation curve.

Additionally or alternatively, one or more supervised and/or unsupervised machine-learning technique(s) may be used to detect an anomalous value in time series data instance 105. By way of example, a labeled dataset (time series data instance examples labeled with an indicator that indicates an anomalous or normal time series) may be used to train a machine-learning model to classify a time series data instance provided as input as being anomalous or normal/not anomalous.

Once a potential anomaly is detected, the flow 100 may continue at block 110, where the operations may include identifying one or more correlated peers corresponding to the entity associated with the particular time series data instance in which the anomaly was initially detected. A "correlated peer" refers to a second entity that is associated with time series data that is identified (e.g., via one or more correlation techniques) as having substantially similar time series behavior as a first entity. By way of example, The ADS 101 may use a correlation technique (e.g., correlation matrix or similar) to identify correlated peers for time series data instance 105 (e.g., entities that are associated with time series data instances that evidence similar time series data behavior as time series data instance 105). This identification can occur at runtime or as a pre-processing step. The ADS 101 may maintain a mapping or other suitable association between correlated peers.

The ADS 101 may use one or more correlation techniques to identify similarities between time series data instance 105 and time series data of correlated peers 109. By way of example, ADS 101 may utilize various comparison techniques to compare the time series data instance 105 and the time series of time series data 103 such as correlation matrixes, covariance/variance ratios, time series volatility, Pearson correlations, Kendall correlations, or the like. In some embodiments, the ADS 101 may use the time series data 105 and compare each datapoint to time series data 103 using a correlation matrix to determine correlation coefficients (e.g., 1 to −1 values arranged in columns and rows of a matrix showing strength and trends for each datapoint). When the time series data instance 105 and a second time series data instance show at least one relationship (predominately +1 or −1 correlation coefficients), the ADS 101 may determine that the two time series are correlated. ADS 101 may maintain a mapping between the entity associated with time series data instance 105 and the second entity and/or ADS 101 may maintain a mapping between time series data instance 105 and the time series data instance associated with the second entity.

In the ongoing example, time series data instance 105 corresponds to a particular bank branch located in Wichita, Kansas. Using a correlation technique, the ADS 101 may identify additional bank branches as correlated peers based at least in part on each of those bank branches historically having similar time series behavior as time series data instance 105. The ADS 101 may maintain associations between the Wichita bank branch and its correlated peers. These correlated peers may, or may not, share similar attributes as the Wichita branch. In some embodiments, the ADS 101 may maintain separate associations based on shared attributes. For example, ADS 101 may maintain an association between the Wichita branch and correlated peers that are located in the same city, another association between the Wichita branch and correlated peers located in the same county, yet another association between the Wichita branch and correlated peers located in the same state, and the like. Alternatively, the ADS 101 may maintain a mapping between the Wichita branch and all of its correlated peers from which subsets may be derived based on a shared attribute value. For example, a subset of the correlated peers may be derived based at least in part on identifying correlated peers that are associated with the same city. A second subset of all correlated peers may be derived based at least in part on identifying the subset of correlated peers that are associated with the same county. A third subset of all correlated peers may be derived based on identifying correlated peers that have the same type of ATM as the Wichita branch, and so on.

In some embodiments, correlated peers may be grouped into subsets based at least in part on a predefined hierarchy (e.g., a geographical hierarchy indicating an order of branch, city, county, state, region, country). For example, a subset of correlated peers may be identified from the set of correlated peers based at least in part on identifying correlated peers that are located in the same city, followed by identifying correlated peers that are located in the same county, and so on, in accordance with the predefined hierarchy. Although geographical hierarchies are utilized in some examples provided herein, it should be appreciated that other hierarchies may be utilized such as a managerial hierarchy that indicates a branch manager, district manager, and regional manager.

Additionally or alternatively, correlated peers may be grouped into subsets based at least in part on a segmentation technique in which a group of correlated peers may be identified based on matching one or more attributes values of the entity corresponding to time series data instance 105 to the attributes values of one or more other entities. For example, a subset of correlated peers may be identified from the set of correlated peers based at least in part on identifying correlated peers that have the same number of ATMs, or that have a lobby, or that have a drive through, etc.

At block 112, operations may be performed to validate that an actual anomaly has occurred. In some embodiments, a subset of correlated peers may be identified. Identifying this subset may be based on a predefined hierarchy and/or through identifying that the first subset of correlated peers share a common attribute.

By way of example, the time series data instance 105 may correspond to a bank branch in Wichita, Kansas. In some embodiments, correlated peers from the same city may be identified from time series data of correlated peers 109 as a first subset of correlated peers according to a predefined hierarchy. ADS 101 may determine whether time series data values of each of the subset of correlated peers was also anomalous (e.g., included a value that fell outside a corresponding confidence interval associated with a respective correlated peer's time series data). If time series data instance 105 indicates an anomalous value that falls outside its corresponding confidence interval, but the values corresponding to at least a predefined threshold (e.g., 90%, 80%, etc.) of the first subset of correlated peers fell within their respective confidence intervals, the anomalous value of time series data instance 105 may be found to be valid (e.g., actually anomalous). Said another way, if the ADS 101 verifies that the time series data of correlated peers is substantially nonconforming (e.g., at least some threshold percentage of the correlated peers were associated with non-anomalous behaving time series data), then the anomalous behavior detected in time series data instance 105 may be considered a valid indication that an actual anomaly has occurred.

Alternatively, if at least some threshold (e.g., 15%, 20%) of the first subset of correlated peers were also deemed anomalous (e.g., the correlated peer's respective time series data included values that fell outside their respective confidence intervals), then it may be determined that the time series data instance 105 is not anomalous (at least with respect to the first subset of correlated peer)s. This comparison may be repeated any suitable number of times with any suitable number of correlated peer groups according to a predefined protocol. Through these comparison, a source and/or impact of an anomaly may be identified. By way of example, when the time series data instance 105 is compared to time series data of correlated peers that share a common attribute value and at least a threshold percentage (e.g., 90%, 80%, etc.) of those correlated peers are associated with time series data that exhibits similarly anomalous behavior, the source and/or impact of the anomaly may be identified as being related to all entities that share the common attribute value.

In response to validating that an actual anomaly has occurred (e.g., that the anomaly detected in the time series data instance 105 was anomalous with respect to one or more correlated peer groups), the flow 100 may continue at block 114, where the ADS 101 may perform one or more operations. The one or more operations may include alerting or notifying client devices such as smartphones (e.g., user device(s) 102) of customers (e.g., user(s) 118) regarding the anomaly and cause. In some examples, the operations may include notifying a system administrator of the source/impact of the anomaly as well as storing time series data instances leading up to and after the anomaly in a database (e.g., data store 812 of FIG. 8). In still further examples, the operations may include storing the event as being associated with a particular level of a hierarchy that the event relates to (e.g., as a bank specific event, a city specific event, a county specific event, a state specific event, etc.). In some embodiments, the ADS 101 may be configured to estimate an impact that would be experienced by one or more adjacent entities (e.g., entities that share a common attribute value, but which currently appear to be unaffected at the time the anomaly source is discovered; but may subsequently be affected in the future). Based on the estimate impact, the ADS 101 may perform one or more remedial actions for the corresponding hierarchy level(s) (e.g., notifying a technician(s), repair crew(s), system administrator(s) of the source of the anomaly, etc.) to enable swift and corrective measures.

Figure 2:
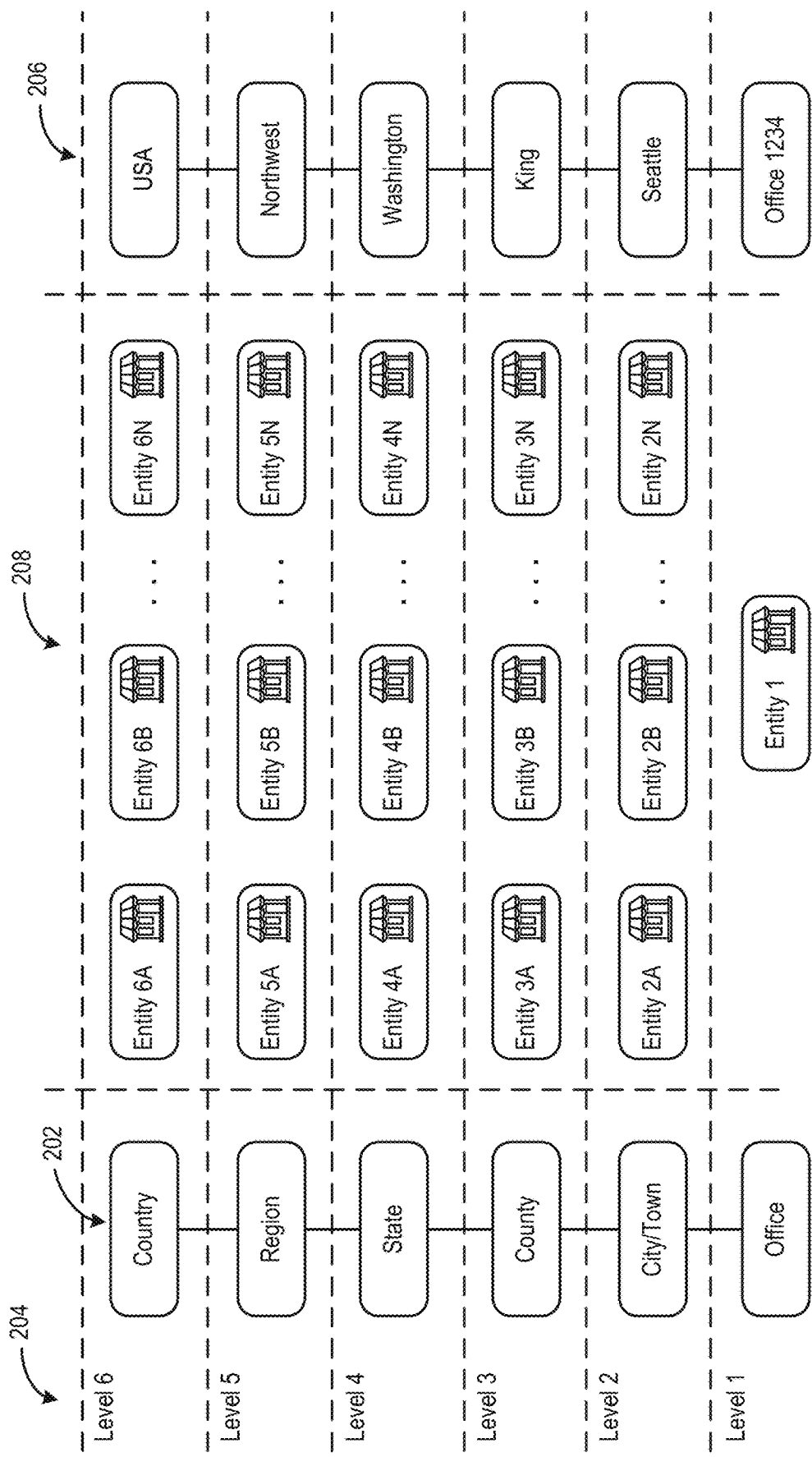
FIG. 2 is an example block diagram illustrating an example hierarchy with which a number of entities correspond, in accordance with at least one embodiment.

FIG. 2 is an example block diagram 200 illustrating an example hierarchy 202 with which a number of entities correspond, in accordance with at least one embodiment. In some embodiments, the hierarchy 202 may be pre-determined and may represent, in this example, geographical relationships. As depicted at 204, hierarchy 202 may include one or more levels. While six levels are depicted at 204, it is contemplated that any suitable number of levels may be utilized in hierarchy 202. In some embodiments, hierarchy 202 may represent an order and/or attributes with which correlated peers may be identified/grouped.

A particular entity (e.g., "office 1234") may be represented in column 206. Office 1234 may be associated with a number of attribute values that individually correspond to hierarchy 202. For example, office 1234 may be associated with various attributes corresponding to a city/town (e.g., "Seattle"), a county (e.g., "King"), a state (e.g., "Washington"), a region (e.g., "Northwest"), and a country (e.g., "USA") is depicted in column 206.

Column 208 may represent entities that share an attribute value corresponding to an attribute of column 202 and to the corresponding attribute value of the entity represented in column 206. In some embodiments, the entities of column 208 may be entities from which correlated peers are identified for the entity represented in column 206. For example, entities 2A-2N may represent all entities that are associated with a city/town attribute with a value equal to "Seattle" from which correlated peers are selected for the entity represented in column 206, or entities 2A-2N may represent only the correlated peers of the entity represented in column 206 that are associated with the same city/town as the entity represented in column 206 (e.g., "Seattle"). Similarly, entities 3A-3N may include all entities (or only correlated peers) that share the same value (e.g., "King") for a county attribute, entities 4A-4N include all entities (or only correlated peers) that share the same value (e.g., "Washington") for a state attribute, entities 5A-5N include all entities (or only correlated peers) that share the same value (e.g., "Northwest") for a region attribute, and entities 6A-6N include all entities (or only correlated peers) that share the same value (e.g., "USA") for a country attribute.

In some embodiments, determining correlated entity peers involves applying one or more correlation analysis algorithms (e.g., Pearson correlation coefficient algorithms or similar) to compare time series data of multiple entities to find those that exhibit similar fluctuations. By way of example, an office in Seattle, Washington (entity 2B) may be identified through correlation analysis and respective time series data as having similarly transaction fluctuations as office 1234, the entity represented in column 206. Accordingly, entity 2B may be considered to be a correlated peer of office 1234. The correlation algorithm may process the time series data of each pair of entities (e.g., entity 2A and the entity represented in column 206) and attempt to correlate the data (e.g., output a value between −1 and 1). If an output (e.g., correlation coefficient) of the correlation algorithm is either −1 or +1, it will show that there is a strong negative or strong positive correlation between the time series data of the two entities. If a correlation coefficient close to +1 (e.g., a difference that is less than a threshold value) is determined, the ADS 101 may determine that the two entities are correlated peers. In an instance where the correlation coefficient is closer to 0 (e.g., a difference that is less than a threshold value), the ADS 101 may determine that the two entities are not correlated peers.

Figure 3:
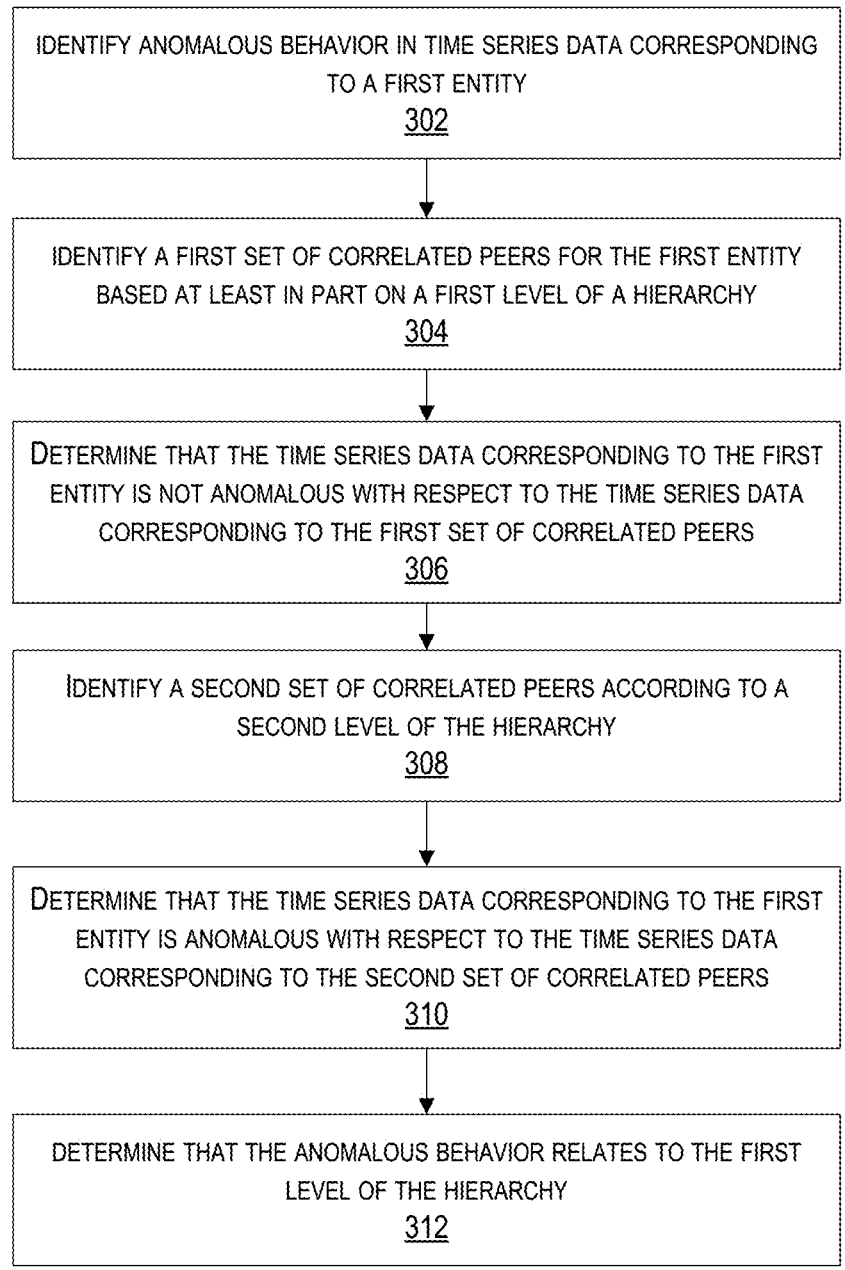
FIG. 3 is a block diagram illustrating an example method for identifying a source of an anomaly based at least in part on a hierarchy, in accordance with at least one embodiment.

FIG. 3 is a block diagram illustrating an example method 300 for identifying a source of an anomaly based at least in part on a hierarchy, in accordance with at least one embodiment. The method 300 may be performed by the ADS 101 of FIG. 1 based at least in part on a hierarchy (e.g., hierarchy 200 of FIG. 2). Further, the method 300 may include additional, or fewer operations than those depicted in FIG. 3. The operations of method 300 may be performed by any suitable portion the ADS 101 of FIG. 1. In some embodiments, block diagram 300 may be executed by components of Anomaly Detection System 600 of FIG. 6.

The method 300 may begin at step 302, where the ADS 101 may identify anomalous behavior corresponding to a first entity. By way of example, anomalous behavior may be identified in time series data corresponding to the entity represented in column 206 of FIG. 2. As a non-limiting example, the time series data may indicate that revenue for the day fell below a confidence interval associated with the entity (e.g., Office 1234).

At 304, a first set of correlated peers may be identified for the entity based at least in part on a first level of a hierarchy. In some embodiments, the lowest level of the hierarchy (e.g., level 1 of the hierarchy 200) may correspond to an office. The hierarchy may be traversed upward to a next highest level (e.g., level 2 of hierarchy 200) which may correspond to a city/town and the first level referred to at 304. In some embodiments, entities 2A-2N may be all entities that share the same city/town as the first entity or the entities 2A-2N may be correlated peers that share the same city/town as the first entity (as identified via previously performed operations, perhaps as part of preprocessing operations). If entities 2A-2N include all entities that share the same city/town as the first entity, the times series data of these entities may be compared to the time series data of the first entity to find those that have time series data that fluctuates in a similar manner as the time series data of the first entity. As discussed above, any suitable correlation analysis technique may be utilized to identify the second set of correlated peers of the first entity from entities 2A-2N.

At 306, it may be determined that the time series data corresponding to the first entity is not anomalous with respect to the time series data corresponding to the first set of correlated peers. By way of example, if the anomalous behavior indicates that the first entity's revenue fell below its confidence interval, the revenue values for some portion of the first set of correlated peers may be analyzed to determine whether revenue values for at least a threshold number or percentage of the correlated peers also fell outside their respective confidence intervals. In some embodiments, if fewer than the threshold number or percentage of the correlated peers are associated with time series data that did not fall outside of their respective confidence intervals, the anomalous behavior may be attributed to the first entity and the method 300 may halt. Alternatively, if at least the threshold number or percentage of the correlated peers are associated with time series data that likewise fell outside of their respective confidence intervals, then the method 300 may proceed to 308.

At 308, where a second set of correlated peers corresponding to a second level of the hierarchy may be identified. By way of example, the hierarchy 200 may be traversed upward from level 2 to level 3, a level immediately higher than the level at which the first set of correlated peers were identified. Level 3, in this example, corresponds to a county (e.g., "King"). In some embodiments, entities 3A-3N may be all entities that share the same county as the first entity or the entities 3A-3N may be correlated peers that share the same county as the first entity (as identified via previously performed operations, perhaps as part of preprocessing operations). If entities 3A-3N include all entities that share the same county as the first entity, the times series data of these entities may be compared to the time series data of the first entity to find those that have time series data that fluctuates in a similar manner as the time series data of the first entity. As discussed above, any suitable correlation analysis technique may be utilized to identify the second set of correlated peers of the first entity from entities 3A-3N.

At 310, it may be determined that the time series data corresponding to the first entity is anomalous with respect to the time series data corresponding to the second set of correlated peers. By way of example, if the anomalous behavior indicates that the first entity's revenue fell below its confidence interval, but the revenue values for some portion of the first set of correlated peers did not fall outside their respective confidence intervals, the time series data corresponding to the first entity may be deemed anomalous.

At 312, based at least in part on determining that the time series data of the first entity is anomalous with respect to the time series data of the second set of correlated peers corresponding to the second level of the hierarchy, the anomalous behavior may be deemed to relate to the first level of the hierarchy (e.g., a last level for which the time series data of the first entity was not anomalous with respect to the time series data of its correlated peers). Although this example only traverses one level upward in the hierarchy (e.g., from level 2 to level 3), it should be appreciated that any suitable number of upward traversals may be performed. When the times series data of correlated peers of a higher level (or at least a threshold number/percentage of those correlated peers) is deemed to conform (exhibit similar behavior) to the time series data of the first entity, the source/impact of the anomaly/anomalous behavior detected in the time series data of the first entity may be determined to relate to entities that share an attribute value corresponding to the level of the hierarchy that is immediately below the higher level. Although the hierarchy 200 utilizes a geographically related hierarchy, similar techniques may be employed with other suitable hierarchies such as a managerial hierarchy to identify a level of management to which anomalous behavior may be deemed to relate.

In some embodiments, if the top level of a hierarchy is reached and the comparisons done with respect to that level do not indicate anomalous behavior of a lower level and there are no higher levels to which a traversal may be made, then the system may determine that the anomalous behavior detected in the time series data of the first entity, does not relate to any aspect of the hierarchy.

The method 300 may be performed any suitable number of time and according to any suitable number of hierarchies. By way of example, using hierarchy 200 and another hierarchy (e.g., a managerial hierarchy of a company to which Office 1234 belongs), the ADS 101 may identify anomalous behavior as relating to all offices in Seattle and/or all offices assigned to a particular manager (e.g., a district or regional manager).

FIG. 4 is an example block diagram 400 illustrating one or more entities, in accordance with at least one embodiment. Entities 402-418 may individually correspond to a banking branch that is associated with a set of corresponding attributes. As depicted in FIG. 4, each entity may be associated with attributes including an identifier (ID), a city, a state, a country, an ATM type, a drive-through, an indoor lobby, a number of employees, and a manager although more or fewer and similar or different attributes may be employed. In some embodiments, entities 404-418 may be correlated peers to entity 402, or entities 404-418 may be entities from which correlated peers to entity 402 may be identified. For the purposes of the examples provided below, the entities 404-418 may be considered to be correlated peers of entity 402.

In the example provided above in connection with FIG. 3, entities that shared the same attribute value for the attribute "city" were identified based at least in part on a predefined hierarchy. However, entities may be segmented/grouped based on sharing a value for different, non-hierarchy related attributes. In the example provided in FIG. 4, entities 414, 416, and 418 may be identified as correlated peers of the entity 402 based at least in part on sharing the same value (e.g., "Seattle") for the attribute "city". In some embodiments, entities 404 and 414 may be identified as correlated peers for entity 402 based at least in part on sharing a common value for the attribute "ATM Type," entities 408, 412, and 414 may be identified as correlated peers for entity 402 based at least in part on sharing a common value for the attribute value "Drive-Through," and entities 404, 406, 408, 414, 416, and 418 may be identified as being correlated peers for entity 402 based at least in part on sharing a common value for the attribute "indoor lobby." Correlated peers may be grouped/segmented based on sharing a common value for any suitable attribute.

Figure 5:
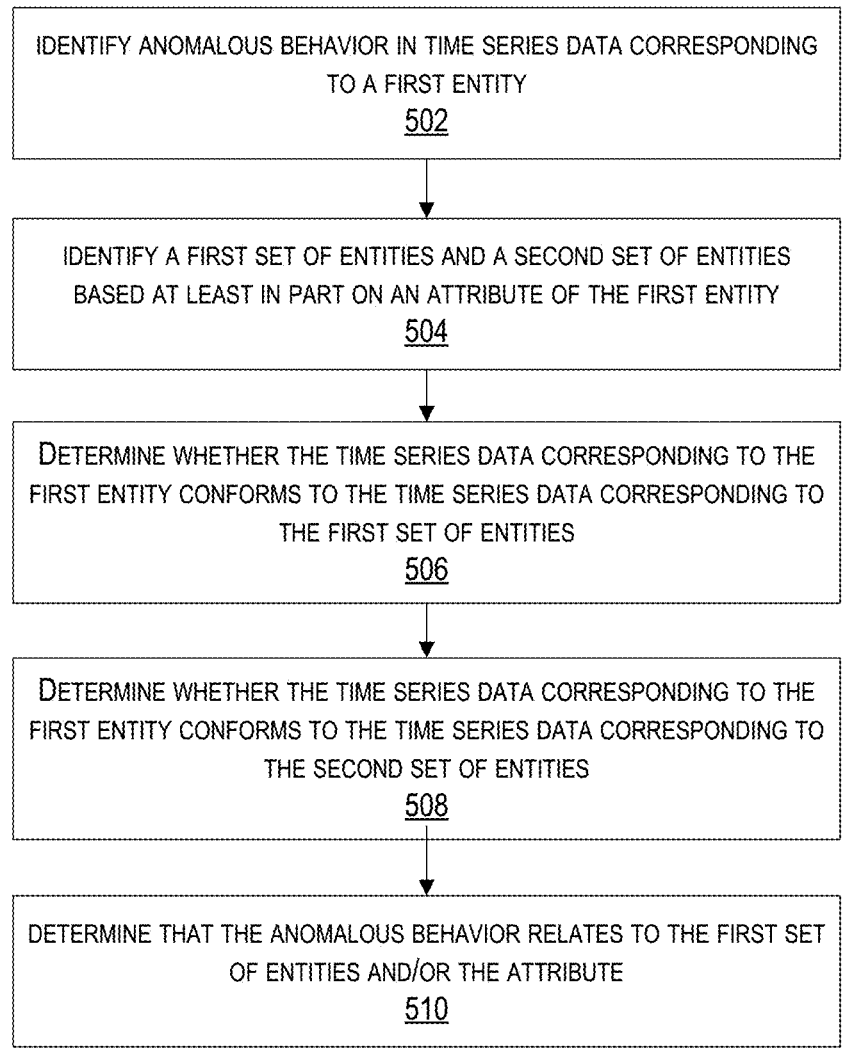
FIG. 5 is a block diagram illustrating an example method for determining one or more correlated peers utilizing segmentation or grouping, in accordance with at least one embodiment.

FIG. 5 is a block diagram illustrating an example method 500 for determining one or more correlated peers utilizing segmentation/grouping techniques, in accordance with at least one embodiment. A non-transitory computer-readable storage medium may store computer-executable instructions that, when executed by at least one processor, cause at least one computer to perform instructions comprising the operations of the method 500. It should be appreciated that the operations of the method 500 may be performed in any suitable order, not necessarily the order depicted in FIG. 5. Further, the method 500 may include additional, or fewer operations than those depicted in FIG. 5. The operations of method 500 may be performed by any suitable portion the ADS 101 of FIG. 1. In some embodiments, method 500 may be executed by components of Anomaly Detection System 600 of FIG. 6.

The method 500, may begin at 502, where the ADS 101 may identify anomalous behavior corresponding to a first entity. By way of example, anomalous behavior may be identified in time series data corresponding to the entity 402 of FIG. 4. As a non-limiting example, the time series data may indicate that a number of banking deposits fell outside a confidence interval and/or another suitable threshold.

At 504, a first set of entities and a second set of entities may be identified based at least in part on an attribute of the first entity. In some embodiments, the entities of the first and second set are correlated peers of the first entity. In some embodiments, the first set of entities may be identified for the entity 402 based at least in part on identifying entities that share a common attribute value for the attribute. By way of example, a first set of entities may be identified as entities 404 and 414 based at least in part on the entities 404 and 414 having the same attribute value (e.g., "ACME123") for the attribute "ATM Type" as the entity 402. The second set of entities may be the set of entities that do not share the same attribute value for the attribute as entity 402. For example, the second set of entities may include entities 406-412, 416, and 418 of FIG. 4.

At 506, the ADS 101 may determine whether the time series data corresponding to the first entity conforms to the time series data corresponding to the first set of entities. This may include determining whether the time series data of the first set of entities had similarly anomalous behavior. As a non-limiting example, if the time series data of the first entity (entity 402) indicates the number of deposits has fallen below a corresponding confidence interval/threshold, the ADS 101 may determine whether the time series data of the first set of entities (e.g., entities 404 and 414) likewise include values that fell below their corresponding confidence intervals/thresholds. In some embodiments, if the times series data of the first set of entities does not exhibit similarly anomalous behavior, the method 500 may begin again using a different attribute to determine the first set of entities and the second set of entities. If the time series data of the first set of entities conform (exhibit similarly anomalous behavior) as the time series data of the first entity, the method 500 may proceed to 508.

At 508, the ADS 101 may determine whether the time series data corresponding to the first entity conforms to the time series data corresponding to the second set of entities (e.g., entities 406-412, 416, and 418). If the times series data of the second set of entities exhibits similarly anomalous behavior, the method 500 may begin again using a different attribute to determine the first set of entities and the second set of entities. If the time series data of the first set of entities do not exhibit similarly anomalous behavior, then the method 500 may proceed to 508.

At 510, the ADS 101 may determine that the anomalous behavior relates to the first set of entities and/or the attribute. This determination may be based at least in part on determining that the time series data of the first set of entities conforms (exhibits similarly anomalous behavior) to the time series data of the first entity, and that the time series data of the second set of entities does not conform (does not exhibit similarly anomalous behavior) to the time series data of the first entity.

The method 500 may be performed any suitable number of times, using any suitable number of attribute segmentations/grouping. The order and/or specific attribute by which entities/time series data instances are grouped into the first set or second set may depend on a predefined attribute order. By way of example, a predefined order of attributes (also referred to as a "segmentation scheme") may be stored by the system which indicates that, when attempting to identify whether an entity's time series behavior is anomalous with respect to the time series data of other entities (e.g., correlated peers), the times series of entities/correlated peers are analyzed first based on ATM type, then by Drive-Through values, followed by Indoor Lobby values. In some embodiments, the order of attributes/segmentation scheme may be determined based on determining, from the attributes of all entities (or all correlated peers), which attributes have the largest number of common values. By way of example, if approximately 50% of the first entity's correlated peers include drive throughs and the other 50% do not, but 80% of the first entity's correlated peers share the same ATM type, the system may group correlated peers based on ATM type over grouping correlated peers based on drive throughs, since an anomaly that is confirmed across a larger number of correlated peers may more conclusively indicate that the anomaly is associated with that attribute (e.g., ATMs of that type), than if the anomaly was confirmed to exist in a smaller grouping. In the ongoing example, the method 500 may first be conducted based on the attributes Indoor Lobby, Drive-Through, and ATM type, in that order, due to the number of entities that share common values for each of those attributes (e.g., 6, 3, and 2, respectively).

Figure 6:
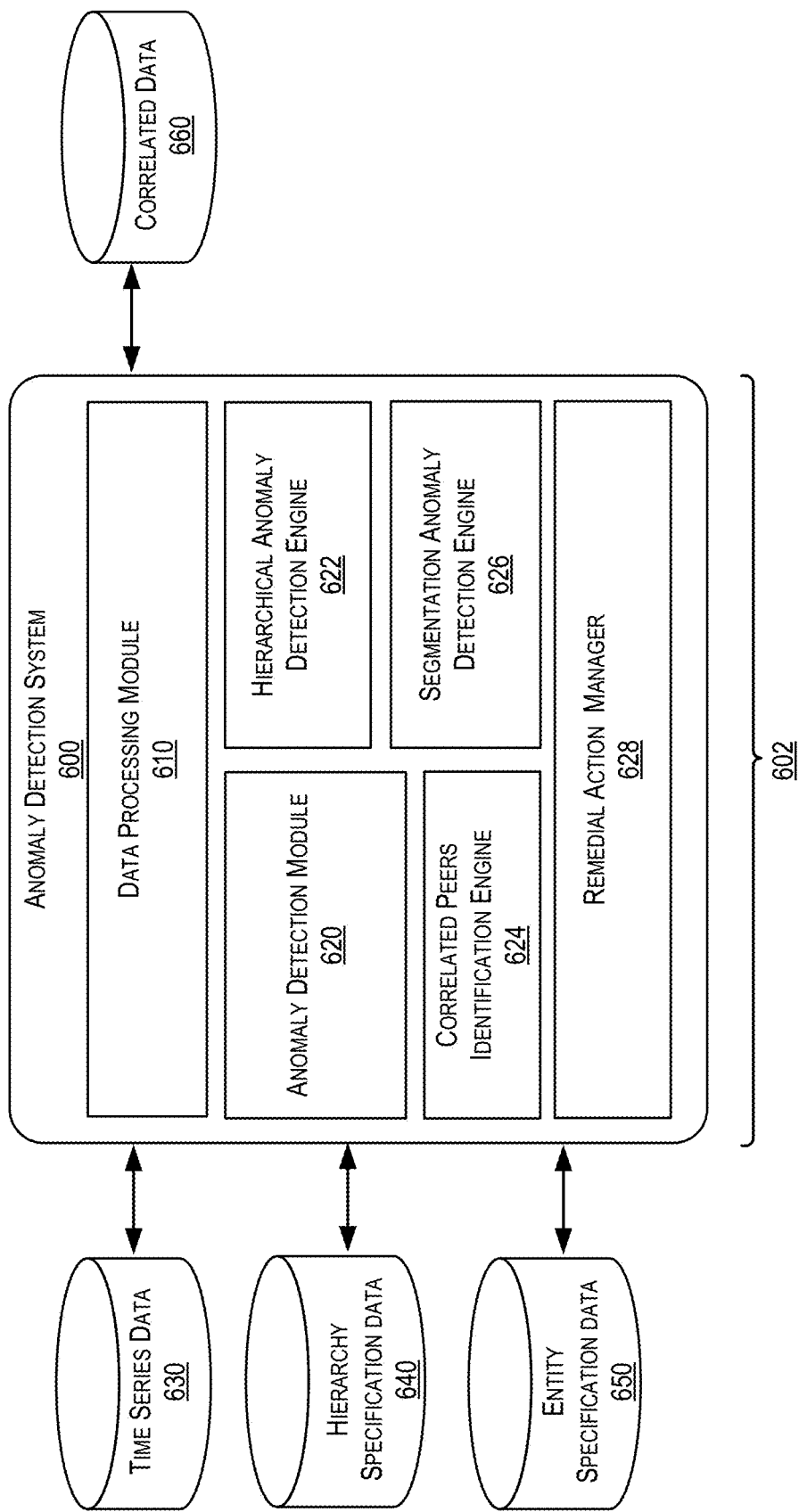
FIG. 6 is a schematic diagram of an example computer architecture for the index enhancement engine, including a plurality of modules that may perform functions in accordance with at least one embodiment.

FIG. 6 is a schematic diagram of an example computer architecture for the Anomaly Detection System 600 (hereinafter "ADS 600"), including a plurality of modules 602 that may perform functions in accordance with at least one embodiment. The ADS 600 may be an example of the ADS 101 of FIG. 1, and may be configured to support the processes, methods, operations, and techniques described above in connection with FIGS. 2-5. The modules 602 may be software modules, hardware modules, or a combination thereof. If the modules are software modules, the modules can be embodied on a computer readable medium and processed by a processor in any of the computer systems described herein. It should be noted that any module or data store described herein, may be, in some embodiments, be a service responsible for providing functionality corresponding to the module described below. The modules 602 may be execute as part of the ADS 600, or the modules 602 may exist as separate modules or services external to the ADS 600. In some embodiments, the modules 602 may be executed by the same or different computing devices, as a service, as an application, or the like.

In the embodiment shown in the FIG. 6, data stores such as time series data 630, hierarchical specification data 640, entity specification data 650, and correlated data 660 are shown, although data can be maintained, derived, or otherwise accessed from various data stores, either remote or local to the ADS 600, to achieve the functions described herein. The ADS 600, as shown in FIG. 6, includes various modules such as a data processing module 610, anomaly detection module 620, hierarchical anomaly detection engine 622, correlated peers identification engine 624, segmentation anomaly detection engine 626, and remedial action manager 628. Some functions of the modules 610-628 are described below. However, for the benefit of the reader, a brief, non-limiting description of each of the modules is provided in the following paragraphs. In accordance with at least one embodiment, a process validating existence of an anomaly and/or for identifying a source of an anomaly is provided.

Time series data 630 may include time series data instances provided by any suitable database, server, cloud infrastructure, and/or monitoring service that provides one or more time series data instances, according to some embodiments. By way of example, the time series data 630 may be collected from different sources (e.g., stock exchange brokerages, pharmacy logistics services, auto-loan providers, financial institutions, etc.) at pre-defined frequencies or according to a predefined schedule. As a further non-limiting example, the frequency of time series data retrieval may be adjustable based on a user defined preference (e.g., via a GUI) or adaptively (e.g., using a deep learning scheme based on historical data). In some examples, data from the time series data 630 may be obtained and/or stored according to a predefined schedule, frequency, or periodicity, or via request. In some embodiments, the frequency at which time series data is collected may be automatically modified by the ADS 600 based at least in part on identifying and/or validating that an anomaly has occurred.

Hierarchy specification data 640 may include any suitable data related to various predefined hierarchies. By way of example, the hierarchical specification data 640 may store hierarchy 200 of FIG. 2, among others. As another non-limiting example, the hierarchical specification data 640 may store and/or transit a taxonomy of Corporation XYZ with duplicate levels as: entities working for Corporation XYZ (level 6, top); entities working as chief officers in Corporation XYZ (level 5); senior management reporting to chief officers (level 4); middle management reporting to senior management (level 3); managers reporting to middle management (level 2); supervisors reporting to middle management (level 2); employees reporting to managers (level 1, bottom); employees reporting to supervisors (level 1, bottom). In some examples, data from the hierarchical specification data 640 may be obtained and/or stored according to a predefined schedule, frequency, or periodicity, or via request.

Entity specification data 650 may include any suitable attribute related to one or more attribute(s) associated with entities, according to some embodiments. By way of example, the entity specification data 650 may store objects or other suitable containers storing the attributes corresponding to each of the entities 402-418 of FIG. 4. In some embodiments, one or more mappings/associations may be identified and maintained within entity specification data 650. These mappings/associations may maintain associations between entities that share a common value for a particular entity. For example, a mapping and/or association may be maintained in entity specification data 650 that indicates that entities 402, 404, and 414 of FIG. 4 share a common value for the attribute "ATM Type." In some embodiments, a mapping or list may be stored in entity specification data 650 that indicates an order by which attribute groupings are to be made with respect to performing the method 500 of FIG. 5. As a non-limiting example, a mapping or list may be stored within entity specification data 650 that indicates that the method 500 is to be performed first based on an ATM Type attribute, then by a Drive-Through attribute, then by an Indoor Lobby attribute.

Correlated data 660 may include any suitable data related to one or more correlated peers. For example, a mapping may be maintained that indicates any suitable number of correlated peer groups, which are groups of entities that have time series data that typically fluctuates in a similar manner. By way of example, a mapping may be maintained between entities that typically see their highest number of transactions on Fridays and their lowest number of transactions on Monday. Correlated peers need not share exactly the same behavior. That is, the time series data of the peers need not rise of fall by the exact same amount, but within a threshold of a proportionate rise or fall. As an example, one entity that typically sees and increase from 100 transaction on Thursdays to 200 transactions on Fridays may be correlated to an entity that typically sees an increase from 500 transactions on Thursdays to 1000 transactions on Fridays. In some embodiments, correlated peer mappings may be identified (e.g., by the correlated peers identification engine 624) as a preprocessing step or during runtime. Once identified, the correlated peer mappings may be stored in correlated data 660 (e.g., a data store configured to store such information).

In at least one embodiment, the ADS 600 includes the data processing module 610. Generally, the data processing module 610 may be utilized to receive any suitable information with respect to any example provided herein. By way of example, the data processing module 610 may be configured to receive and process requests and/or store one or more data set(s) in/from the time series data 630. The requests may include requests for time series data from a plurality of monitored entities (e.g., end of day transactions of a bank, cash withdrawals for the day for ATMs, loans given/rejected for vehicles, etc.) and/or historical data associated with the plurality of entities. The data processing module 610 may function as a coordinator for transferring, processing requests, and storing data between one or more of the time series data 630, hierarchical specification data 640, entity specifications data 650, correlated data 660, and the modules 610-628.

In some embodiments, data processing module 610 may be configured to identify entities that share a common attribute value (e.g., a common hierarchy related attribute value or a common non-hierarchy related attribute. In some embodiments, as part of preprocessing or runtime operations, the data processing module 610 may use a hierarchy stored in hierarchy specification data to identify entities that share a common attribute value with respect to each level of the hierarchy. In some embodiments, entities that share a common attribute value for each level of the hierarchy may be stored din hierarchy specification data 640. Similarly, data processing module 610 may be configured to identify entities that share a common non-hierarchy related attribute value. By way of example, the data processing module 610 may identify groups of entities that share a common attribute value from the entity attributes stored in entity specification data 650. In some embodiments, the data processing module 610 may identify entities that have common attribute values only for the attributes for which a grouping order is identified. For example, if a mapping in entity specification data 650 indicates that method 500 is to be performed based on attribute 1 first, followed by attribute 2, followed by attribute 3, the data processing module 610 may be configured to identify one set of entities that share a common attribute values for attribute 1, another set of entities that share a common attribute values for attribute 2, and another set entities that share a common attribute values for attribute 3. Mappings or other suitable associations that indicate these sets may be stored in any suitable location such as the entity specification data 650.

Correlated peers identification engine 624 may include any suitable instructions that, when executed, identify any suitable number of correlated peer groups (e.g., entities that have similar time series data behavior according to a particular attribute), according to some embodiments. The correlated peers identification engine 624 may receive time series data instances (e.g., data relating to various operations such as transactions, software changes, economic and political analytic trends, etc.) from a number of entities (e.g., loan providers, medical service providers, manufacturing plants, etc.) or may obtain time series data from time series data 630 (a data store configured to store time series data instances). The correlated peer identification engine 624 may use a number of approaches for determining correlations between various time series data instances such as, but not limited to, histogram comparisons, correlation matrices, Fourier transforms, dynamic time warping, Euclidean distance schemes, etc. depending on the attribute, the complete scope (e.g., full time period necessary to yield a result) and complexity of the time series data instances (e.g., how many time series data instances in total need to be correlated). In some embodiments, the functionality of correlated peers identification engine 624 may be performed as part of preprocessing or runtime tasks.

Anomaly detection module 620 may include any suitable instructions to detect anomalous behavior. In addition, the anomaly detection module 620 may determine whether a time series data value falls within or outside a threshold confidence interval. In some embodiments, the anomaly detection module 620 may be configured to detect an anomaly when a time series data value exceeds an upper limit of a confidence interval or falls below a lower limit of a confidence interval by a pre-determined threshold (e.g., a user-defined, predefined, or dynamically defined through machine-learning threshold value). In some examples, the anomaly detection module 620 may determine initially whether the time series data instance received from the time series data 630 is anomalous by comparing the time series data instance to historical data (e.g., data from the previous hour, previous day, previous week, previous years, etc.). When the time series data instance is determined to include anomalous behavior (e.g., one or more anomalous values), the anomaly detection module 620 may invoke (e.g., based at least in part on a predefined rule set) either or both the hierarchical anomaly detection engine 622 or the segmentation anomaly detection engine 626. In some embodiments, the anomaly detection module 620 may be configured to provide output to the remedial action manager 628 when one or more anomalies are detected. In some embodiments, sending such data to the remedial action manager 628 may cause a frequency or schedule at which time series data is collected for a given entity (e.g., the entity corresponding to the time series data in which the anomaly was detected) to be modified. For example, the remedial action manager 628 may increase a frequency at which the time series data is collected for that entity (e.g., from daily to hourly collections).

Hierarchical anomaly detection engine 622 may include any suitable instructions to execute identifying anomalies based at least in part on one or more hierarchies. In some embodiments, hierarchical anomaly detection engine 622 may perform the operations discussed above in connection to FIG. 3. By way of example, the hierarchical anomaly detection engine 622 may take a predefined hierarchy stored by the hierarchy specification data 640 (e.g., branch, city/town, district, region state, country), and identify a next-highest level from a current level. The hierarchical anomaly detection engine 622 may call the correlated peer identification engine 624 or retrieve correlated peer identifiers from the correlated data 660 to obtain a set of correlated peers that are associated with a given entity (e.g., the entity corresponding to the time series data in which the anomaly was first detected) at a particular level of the hierarchy. If the hierarchical anomaly detection engine 622 determines that one or more correlated peers, identified by the correlated peers identification engine 624, exhibits similar behavior and/or were also anomalous at one level (e.g., level 2 of FIG. 2), the hierarchical anomaly detection engine 622 may increase the level of the analysis to the next-highest level (e.g., level 3) and perform the correlated peer analysis anew as described in connection with method 300 of FIG. 3. In cases in which the hierarchical anomaly detection engine 622 identifies that a source/impact of an anomaly/anomalous behavior can be attributed to a particular level of the hierarchy (e.g., all entities in a given city), the hierarchical anomaly detection engine 622 may report any suitable data related to the corresponding to a level of the hierarchy and/or the entities of that level to the remedial action manager 628 for remedial steps to be performed. The hierarchical anomaly detection may be configured to perform any suitable number of hierarchy based analyses based at least in part on a predefined number and order of hierarchies (e.g., a number and hierarchy order stored in hierarchy specification data 640). It is contemplated that the hierarchical anomaly detection engine 622 may work in conjunction, in addition to, or independently of the segmentation anomaly detection engine 626 according to some embodiments.

Segmentation anomaly detection engine 626 may be triggered by the anomaly detection module 620 as a result of a determination that the time series data instance indicates anomalous behavior. In some embodiments, the segmentation anomaly detection engine 626 may be configured to perform the method 500 of FIG. 5. Upon identifying that anomalous behavior is related to one or more attributes (e.g., entities that have an ATM of a particular type and/or entities with indoor lobbies) the segmentation anomaly detection engine 626 may report any suitable data related to the attribute(s)/attribute value(s), anomalous behavior, or entities sharing the attribute value(s) to the remedial action manager 628 for remedial steps to be performed. In some embodiments, the segmentation anomaly detection engine 626 may be configured to analyze time series data of correlated peers based on any suitable number of attributes. The order of attributes may be obtained from a predefined attribute order stored in entity specification data 650, or the segmentation anomaly detection engine 626 may identify the order based at least in part on a number of entities that share attribute values. By way of example, if approximately 50% of the entities (or correlated peers) have an attribute that indicates the entity includes a drive through (and 50% of the entities (or correlated peers) are associated with an attribute value that indicates those entities do not include a drive through), but 80% of the entities (or correlated peers) are associated with an attribute that indicates that they share the same ATM type, the segmentation anomaly detection engine 626 may conduct an analysis based on ATM type in lieu of, or at least prior to, conducting an analysis based on drive throughs. The segmentation anomaly detection engine 626 may be configured to perform a predefined number of attribute based analyses, or the number of analyses performed may correspond to a predefined number of attributes in a predefined order of attributes stored in entity specification data 650. As yet another example, the segmentation anomaly detection engine 626 may be configured to perform an analysis according to each attribute for which a threshold number or percentage of entities share the same attribute value (e.g., every attribute for which at least 60% of the entities share a common value). It is contemplated that the segmentation anomaly detection engine 626 may work in conjunction, in addition to, or independently of the hierarchical anomaly detection engine 622 according to some embodiments.

Remedial action manager 628 may include any suitable instructions to execute one or more remedial actions, according to some embodiments. By way of example, the remedial action manager 628 may receive data from the hierarchical anomaly detection engine 622 and/or the segmentation anomaly detection engine 626 which may indicate a probable source (e.g., hierarchy level, attribute value) and/or impact (entities affected) of anomalous behavior initially identified in a particular time series data instance. In response to receiving the data from one or both engines, the remedial action manager 628 may send one or more notification(s) indicating the source and/or impact of the anomalous behavior. In some examples, the notification(s) may be sent via email, a push notification, a short message service message (SMS), a report detailing the analysis and/or source of the anomalous value, etc. to one or more client device(s) for display on a graphical user interface. In some embodiments, the remedial action manager 628 may adjust any suitable frequency or schedule by which one or more time series are collected for one or more entities based on any suitable trigger (e.g., data it receives from any other module of the anomaly detection system 600.

Figure 7:
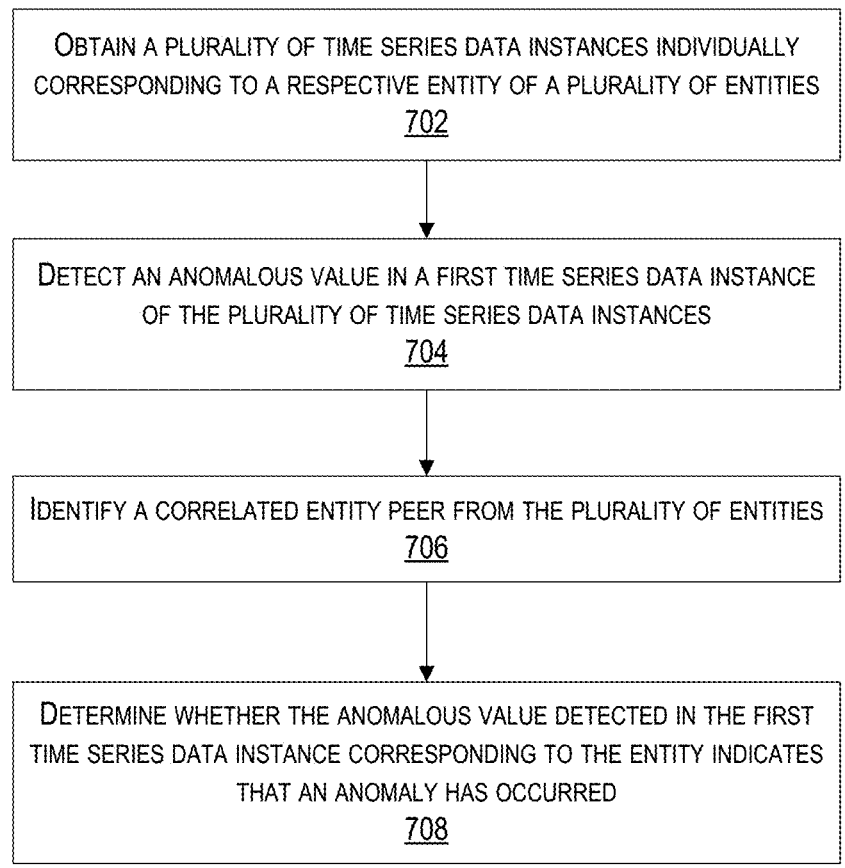
FIG. 7 is a block diagram illustrating an example method for determining whether an anomalous value indicates that an anomaly has occurred, in accordance with at least one embodiment.

FIG. 7 is a block diagram illustrating an example method 700 for determining whether an anomalous value indicates that an anomaly has occurred, in accordance with at least one embodiment. A non-transitory computer-readable storage medium may store computer-executable instructions that, when executed by at least one processor, cause at least one computer to perform instructions comprising the operations of the method 700. It should be appreciated that the operations of the method 700 may be performed in any suitable order, not necessarily the order depicted in FIG. 7. Further, the method 700 may include additional, or fewer operations than those depicted in FIG. 7. The operations of method 700 may be performed by any suitable portion of the ADS 600 of FIG. 6 or ADS 101 of FIG. 1 which may include one or more computing devices such as computing device 800 of FIG. 8.

The method 700, may begin at 702, wherein a plurality of time series data instances may be obtained (e.g., by the data processing module 610 of FIG. 6 and/or the anomaly detection module 620 of FIG. 6). The plurality of time series data instance may individually correspond to a respective entity (e.g., entity 402 of FIG. 4) of a plurality of entities (e.g., entities 402-418 of FIG. 4).

At 704, an anomalous value in a first time series data instance of the plurality of time series data instances may be detected (e.g., by the anomaly detection module 620). In some embodiments, the first time series data instance may be associated with an entity of the plurality of entities.

At 706, the method 700 may include identifying a correlated entity peer from the plurality of entities. In some embodiments, the correlated entity peer may be identified based at least in part on executing a correlation analysis algorithm on the first time series data instance corresponding to the entity and a second time series data instance corresponding to a second entity of the plurality of entities.

At 708, a determination may be made as to whether the anomalous value detected within the first time series data instance associated with the entity indicates that an anomaly has occurred. This determination may be based at least in part on determining whether the anomalous value detected within the first time series data instance associated with the entity conforms to a value of the second time series data instance corresponding to the correlated entity peer.

Figure 8:
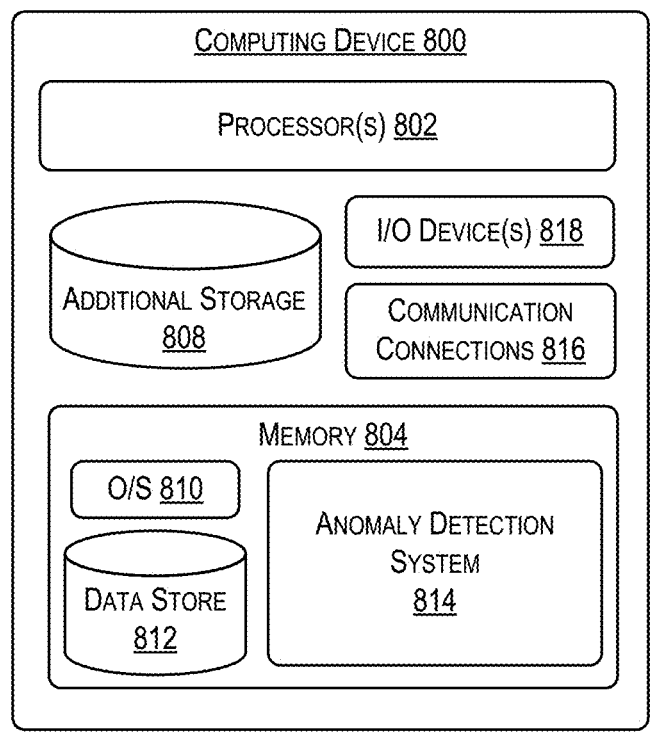
FIG. 8 illustrates an example computing device that may implement the methods disclosed herein.

FIG. 8 illustrates an example computing device 800 that may implement the methods disclosed herein. In some embodiments, the computing device 800 may include one or more processors (e.g., processor(s) 802). The processor(s) 802 may be implemented in hardware, computer-executable instructions, firmware, or combinations thereof. Computer-executable instruction or firmware implementations of the processor(s) 802 may include computer-executable or machine-executable instructions written in any suitable programming language.

Computing device 800 may include memory 804. The memory 804 may store computer-executable instructions that are loadable and executable by the processor(s) 802, as well as data generated during the execution of these programs. The memory 804 may be volatile (such as RAM) and/or non-volatile (such as ROM, flash memory, etc.). The computing device 800 may include additional storage 806, which may include removable storage and/or non-removable storage. The additional storage 806 may include, but is not limited to, magnetic storage, optical disks and/or tape storage. The disk drives and their associated computer-readable media may provide non-volatile storage of computer-readable instructions, data structures, program modules, and other data for the computing devices. In some implementations, the memory 804 or additional storage 806 may individually, or collectively, include multiple different types of memory, such as SRAM, DRAM, or ROM.

The memory 804 and/or additional storage 808 may be examples of computer-readable storage media. Computer-readable storage media may include volatile, or non-volatile, removable or non-removable media implemented in any method or technology for storage of information such as computer-readable instructions, data structures, program modules, or other data. In some embodiments, memory 804 and the additional storage 808 are examples of computer storage media. Memory 804 and/or additional storage 808 may include, but are not limited to, PRAM, SRAM, DRAM, RAM, ROM, EEPROM, flash memory or other memory technology, CD-ROM, DVD, magnetic tape, magnetic disk storage or other magnetic storage devices, or any other medium which can be used to store the desired information and which can be accessed by the computing device 800. Combinations of any of the above should also be included within the scope of computer-readable media. Computer-readable media may include computer-readable instructions, program modules, or other data transmitted within a data signal, such as a carrier wave, or other transmission. However, as used herein, computer-readable storage media does not include computer-readable communication media.

The memory 804 may include an operating system 808 and one or more data stores 810, and/or one or more application programs, modules, or services for implementing the features disclosed herein, such as the features provided by the anomaly detection system 814 (an example of the ADS 600 of FIG. 6 and/or the ADS 101 of FIG. 1).

The computing device may also contain communications connection(s) 816 that allow the computing device 800 to communicate with a stored database, another computing device, a server, user terminals and/or other devices (e.g., via one or more networks, not depicted). The computing device may also include I/O device(s) 818, such as a keyboard, a mouse, a pen, a voice input device, a touch input device, a display, speakers, a printer, etc.

The various embodiments further can be implemented in a wide variety of operating environments, which in some cases can include one or more user computers, computing devices or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random-access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Where terms are used without explicit definition as recited herein, it is understood that the ordinary meaning of the word is intended, unless a term carries a special meaning in the field of anomaly detection or other relevant fields. The terms "about" or "substantially", "similar to", "similar", "approximately" are used to indicate a deviation from the stated property or numerical value within which the deviation has little to no influence of the corresponding function, property, or attribute of the structure being described. In an illustrated example, where a dimensional parameter is described as "substantially equal" to another dimensional parameter, the term "substantially" is intended to reflect that the two dimensions being compared can be unequal within a tolerable limit, such as a fabrication tolerance. In the present disclosure, "ranges" refers to a range of values between the two stated extents and/or including one of the two stated extents.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   obtaining, by a computing device, a plurality of time series data instances individually corresponding to a respective entity of a plurality of entities;
   detecting, by the computing device, an anomalous value in a first time series data instance of the plurality of time series data instances, the first time series data instance being associated with an entity of the plurality of entities;
   identifying, from a predefined geographical hierarchy, a first level to which the entity is associated, the predefined geographical hierarchy comprising a plurality of levels corresponding to different geographical areas with which respective subsets of the plurality of entities are individually associated;
   identifying, by the computing device, a first correlated entity peer from the plurality of entities based at least in part on executing a correlation analysis algorithm on the first time series data instance corresponding to the entity and a second time series data instance corresponding to a second entity of the plurality of entities, the second entity being associated with a second level of the predefined geographical hierarchy that is different from the first level with which the entity is associated;

identifying, by the computing device, a second correlated entity peer from the plurality of entities based at least in part on executing the correlation analysis algorithm on the first time series data instance corresponding to the entity and a third time series data instance corresponding to a third entity of the plurality of entities, the third entity being associated with a common attribute with which the entity is associated;

determining that an anomaly has occurred based at least in part on determining whether the anomalous value detected within the first time series data instance conforms to at least one of a first value of the second time series data instance corresponding to the first correlated entity peer or a second value of the third time series data instance corresponding to the second correlated entity peer; and identifying a source of the anomaly as being associated with at least one of: 1) the first level or the second level of the predefined geographical hierarchy or 2) the common attribute with which the entity and the third entity are both associated.

2. The computer-implemented method of claim 1, further comprising performing one or more operations in response to determining that the anomalous value indicates that the anomaly has occurred, wherein the one or more operations comprising transmitting a notification, transmitting an electronic message, or presenting data indicating the anomaly has occurred.

3. The computer-implemented method of claim 1, wherein determining that the anomaly has occurred is based at least in part on determining that the first value of the second time series data instance is anomalous.

4. The computer-implemented method of claim 1, wherein identifying the first correlated entity peer further comprises:

obtaining the predefined geographical hierarchy;

identifying a lowest level of the predefined geographical hierarchy with which the entity is associated, the lowest level being the first level; and identifying the second level based at least in part on identifying a next-lowest level of the predefined geographical hierarchy that is higher than the first level with which the entity is associated.

5. The computer-implemented method of claim 1, wherein identifying the second correlated entity peer further comprises obtaining a first attribute value associated with the entity, wherein the second correlated entity peer is identified based at least in part on being associated with a second attribute value that matches the first attribute value.

6. The computer-implemented method of claim 1, wherein the anomaly is identified as relating to the entity and the first correlated entity peer or the second correlated entity peer.

7. The computer-implemented method of claim 1, wherein the source of the anomaly is identified being associated with the first level of the predefined geographical hierarchy based at least in part on determining that the anomalous value detected within the first time series data instance fails to conform to the second value of the third time series data instance corresponding to the second correlated entity peer.

8. The computer-implemented method of claim 1, wherein the source of the anomaly is identified being associated with the common attribute based at least in part on determining that the anomalous value detected within the first time series data instance conforms to conform to the second value of the third time series data instance corresponding to the second correlated entity peer.

9. A system, comprising:

one or more processors; and one or more memories storing computer-executable instructions that, when executed by the one or more processors, causes the one or more processors to:

obtain a plurality of time series data instances individually corresponding to a respective entity of a plurality of entities;

detect an anomalous value in a first time series data instance of the plurality of time series data instances, the first time series data instance being associated with an entity of the plurality of entities;

identify, from a predefined geographical hierarchy, a first level to which the entity is associated, the predefined geographical hierarchy comprising a plurality of levels corresponding to different geographical areas with which respective subsets of the plurality of entities are individually associated;

identify a first correlated entity peer from the plurality of entities based at least in part on executing a correlation analysis algorithm on the first time series data instance corresponding to the entity and a second time series data instance corresponding to a second entity of the plurality of entities, the second entity being associated with a second level of the predefined geographical hierarchy that is different from the first level with which the entity is associated;

identify a second correlated entity peer from the plurality of entities based at least in part on executing the correlation analysis algorithm on the first time series data instance corresponding to the entity and a third time series data instance corresponding to a third entity of the plurality of entities, the third entity being associated with a common attribute with which the entity is associated;

determine that an anomaly has occurred based at least in part on determining whether the anomalous value detected within the first time series data instance conforms to at least one of a first value of the second time series data instance corresponding to the first correlated entity peer or a second value of the third time series data instance corresponding to the second correlated entity peer; and identify a source of the anomaly as being associated with at least one of 1) the first level or the second level of the predefined geographical hierarchy or 2) the common attribute with which the entity and the third entity are both associated.

10. The system of claim 9, wherein executing the computer-executable instructions further causes the one or more processors to perform one or more operations in response to determining that the anomalous value indicates that the anomaly has occurred, wherein the one or more operations comprising transmitting a notification, transmitting an electronic message, or presenting data indicating the anomaly has occurred.

11. The system of claim 9, wherein determining that the anomaly has occurred is based at least in part on determining that the first value of the second time series data instance is anomalous.

12. The system of claim 9, wherein executing the computer-executable instructions further causes the one or more processors to identify the first correlated entity peer further causes the one or more processors to:
obtain the predefined geographical hierarchy;
identify a lowest level of the predefined geographical hierarchy with which the entity is associated, the lowest level being the first level; and
identify the second level based at least in part on identifying a next-lowest level of the predefined geographical hierarchy that is higher than the first level with which the entity is associated.

13. The system of claim 9, wherein executing the computer-executable instructions further causes the one or more processors to identify the second correlated entity peer further causes the one or more processors to obtain a first attribute value associated with the entity, wherein the second correlated entity peer is identified based at least in part on being associated with a second attribute value that matches the first attribute value.

14. The system of claim 9, wherein the anomaly is identified as relating to the entity and the first correlated entity peer or the second correlated entity peer.

15. A non-transitory computer-readable storage medium storing computer-executable instructions that, when executed with one or more processors of a computing device, causes the computing device to:
obtain a plurality of time series data instances individually corresponding to a respective entity of a plurality of entities;
detect an anomalous value in a first time series data instance of the plurality of time series data instances, the first time series data instance being associated with an entity of the plurality of entities;
identify, from a predefined hierarchy, a first level to which the entity is associated, the predefined hierarchy comprising a plurality of levels with which respective subsets of the plurality of entities are individually associated;
identify a first correlated entity peer from the plurality of entities based at least in part on executing a correlation analysis algorithm on the first time series data instance corresponding to the entity and a second time series data instance corresponding to a second entity of the plurality of entities, the second entity being associated with a second level of the predefined hierarchy that is different from the first level with which the entity is associated;
identify a second correlated entity peer from the plurality of entities based at least in part on executing the correlation analysis algorithm on the first time series data instance corresponding to the entity and a third time series data instance corresponding to a third entity of the plurality of entities, the third entity being associated with a common attribute with which the entity is associated;
determine that an anomaly has occurred based at least in part on determining whether the anomalous value detected within the first time series data instance conforms to at least one of a first value of the second time series data instance corresponding to the first correlated entity peer or a second value of the third time series data instance corresponding to the second correlated entity peer; and
identify a source of the anomaly as being associated with at least one of: 1) the first level or the second level of the predefined hierarchy or 2) the common attribute with which the entity and the third entity are both associated.

16. The non-transitory computer-readable storage medium of claim 15, wherein executing the computer-executable instructions further causes the computing device to perform one or more operations in response to determining that the anomalous value indicates that the anomaly has occurred, wherein the one or more operations comprising transmitting a notification, transmitting an electronic message, or presenting data indicating the anomaly has occurred.

17. The non-transitory computer-readable storage medium of claim 15, wherein determining that the anomaly has occurred is based at least in part on determining that the first value of the second time series data instance is anomalous.

18. The non-transitory computer-readable storage medium of claim 15, wherein executing the computer-executable instructions further causes the one or more processors to identify the first correlated entity peer further causes the one or more processors to:
obtain the predefined hierarchy;
identify a lowest level of the predefined hierarchy with which the entity is associated, the lowest level being the first level; and
identify the second level based at least in part on identifying a next-lowest level of the predefined hierarchy that is higher than the first level with which the entity is associated.

19. The non-transitory computer-readable storage medium of claim 15, wherein executing the computer-executable instructions further causes the computing device to identify the second correlated entity peer further causes the one or more processors to obtain a first attribute value associated with the entity, wherein the second correlated entity peer is identified based at least in part on being associated with a second attribute value that matches the first attribute value.

20. The non-transitory computer-readable storage medium of claim 15, wherein the predefined hierarchy is a predefined geographical hierarchy or a predefined managerial hierarchy.

* * * * *